(12) United States Patent
Kanatani et al.

(10) Patent No.: US 7,593,072 B2
(45) Date of Patent: Sep. 22, 2009

(54) DISPLAY DEVICE

(75) Inventors: Yoshiharu Kanatani, Osaka (JP); Yukio Shimamura, Osaka (JP)

(73) Assignee: Suntechopt Corporation, Nara (JP)

( * ) Notice: Subject to any disclaimer, the term of this patent is extended or adjusted under 35 U.S.C. 154(b) by 577 days.

(21) Appl. No.: 10/573,000

(22) PCT Filed: Jan. 7, 2005

(86) PCT No.: PCT/JP2005/000152

§ 371 (c)(1),
(2), (4) Date: Mar. 23, 2006

(87) PCT Pub. No.: WO2006/013648

PCT Pub. Date: Feb. 9, 2006

(65) Prior Publication Data

US 2007/0052931 A1    Mar. 8, 2007

(30) Foreign Application Priority Data

Aug. 5, 2004    (JP) .............................. 2004-229618

(51) Int. Cl.
G03B 21/14    (2006.01)
(52) U.S. Cl. .................... 349/69; 349/119; 349/122; 349/64; 349/106; 349/108
(58) Field of Classification Search ............ 349/64, 349/69, 107, 106, 108, 119, 122
See application file for complete search history.

(56) References Cited

U.S. PATENT DOCUMENTS 5,648,858 A    7/1997    Shibata et al.
5,815,229 A    9/1998    Shapiro
6,011,601 A *    1/2000    Kojima .................. 349/62
2003/0098933 A1    5/2003    Suzuki et al.

FOREIGN PATENT DOCUMENTS

| EP | 0692730 | 1/1996 |
|----|---------|--------|
| GB | 2337629 | 11/1999 |
| JP | 04-081719 | 3/1992 |
| JP | 6-102506 | 4/1994 |

(Continued)

Primary Examiner—James P Hughes
(74) Attorney, Agent, or Firm—William L. Androlia; H. Henry Koda

(57) ABSTRACT

An object of the present invention is to provide a display device that can be manufactured more easily than the conventional one. To accomplish this object, an image control panel part (7) which is continuously provided with combination base units including optical transparency base units and optical no-transparency base units, and a lens film part (6) which is continuously provided with repeating units of lenses (8) are laminated in a direction of light transmission, and either one width of the optical transparency base unit or a pitch of the repeating unit of the lens is set so as to be the integral multiplication of the other width. Since the moiréfringes can be prevented by setting either one width of the optical transparency base unit or the pitch of the repeating unit of the lens 8 so as to be the integral multiplication of the other width, it is not always necessary for the display device of the present invention to change a pitch of the mold for manufacturing the lens film part 6 randomly.

6 Claims, 14 Drawing Sheets

FOREIGN PATENT DOCUMENTS

| | | |
|---|---|---|
| JP | 8-054517 | 2/1996 |
| JP | 9-055110 | 2/1997 |
| JP | 11-219609 | 8/1999 |
| JP | 2001-042310 | 2/2001 |
| JP | 2002-504698 | 2/2002 |
| JP | 2002-277871 | 9/2002 |
| JP | 2004-192827 | 7/2004 |

* cited by examiner

One pixel composed of thee dots R, G, and B

Liquid crystal panel of
X - Y matrix electrode structure

Bold lines are valleys of prism.
Thin lines are peaks of prism.

Vertically Striped Prism Lens Film

Relation between R, G, B dots of
a liquid crystal panel and a pixel

Liquid Crystal Panel with Delta Alignment

Effective Lens Pitch

Result of first example

Result of second example

Result of third example

Result of forth example

DISPLAY DEVICE

BACKGROUND OF THE INVENTION

1. Field of the Invention

The present invention relates to a display device such as a liquid crystal panel of a personal computer, a TV set and others.

2. Description of the Related Art

Conventionally, there has been a display device such as a liquid crystal panel. (For example, Patent document 1)

As shown in FIG. 13, this display device includes a light guide plate 1, a diffusion film 2, a translucent film 3 (for enhancing a luminance), one surface of which is a substantially flat and another surface has a parallel prismatic shape, a diffusion film 6, and a liquid crystal panel 4, and these are laminated in this order.

Further, other proposals are made for the translucent film having the prismatic shape. (For example, Patent document 2) As shown in FIG. 14, an optical film 60 (equivalent to the above-mentioned translucent film) has a structural surface 64 and a surface 62 opposed to the structural surface 64. The structural surface 64 has a plurality of structures 66 and acts like prisms, however, the heights of the structures 66 vary continuously along their length and the depths of the valleys between the peaks also vary continuously. Moiré (interference fringes) phenomenon of the display device can be prevented by making the peaks and valleys of the prisms to have random shapes with no periodical patterns. Further, a cylindrical mold (roll) used for manufacturing an optical film having the prismatic shape like mentioned above is made by processing a surface of the mold by diamond turning techniques. When processing the mold for the optical film, a pitch of the diamond tool has to be changed randomly so as not to have periodical patterns, for example, the diamond turning tool is put deeply or shallowly at random. However, to change the pitch randomly like this is very difficult.

Patent document 1: JP-A-6-102506 (P. 2, FIG. 3)
Patent document 2: JP-T-2002-504698 (P. 12, FIG. 5)

SUMMARY OF THE INVENTION

Therefore, the present invention has been made taking the foregoing problems into consideration and an object of which is to provide a display device that can be manufactured more easily than the conventional one.

In order to solve the problem, the present invention has the following technical measures.

(1) In the display device according to the present invention, an image control panel part which is continuously provided with combination base units including optical transparency base units and optical no-transparency base units, and a lens film part which is continuously provided with repeating units of lenses are laminated in a direction of light transmission, and either one width of the optical transparency base unit or a pitch of the repeating unit of the lens is set so as to be the integral multiplication of the other width.

The integer number means a positive natural number, namely, a natural number (1, 2, 3, 4, 5 . . . ). The lens film part may have a prism-array-shape composed of peaks and valleys. The pitch of the repeating unit of the lens film part means a size between the peaks or between the valleys.

Since either one width of the optical transparency base unit or the pitch of the repeating unit of the lens are set so as to be the integral multiplication of the other width, the display device of the present invention can prevent the moiré fringes. Therefore, it is not always necessary to change a pitch of the mold for manufacturing the lens film part randomly and the display device can be manufactured more easily than the conventional one. Here, it is wholly unexpected that the moiré can be prevented and a periodicity of deviation, which has been a problem conventionally, can be eliminated by controlling a relation between the width of "the optical transparency base unit and the pitch of the repeating unit of "the lens" instead of "the combination base unit including the optical transparency base unit and the optical no-transparency base unit".

In the above, either case is fine that the width of the optical transparency base unit may be set so as to be the integral multiplication of the pitch of the repeating unit of the lens, or the width of the pitch of the repeating unit of the lens may be set so as to be the integral multiplication of the optical transparency base unit.

(2) In the combination base unit, the optical transparency base unit may be formed with color filters of plural colors and the optical no-transparency base unit may be arranged between the plural color filters. Either one width of the optical transparency base unit, which is obtained by subtracting the total widths of the optical no-transparency base units arranged between the mutual color filters of the plural colors from the width of the combination base unit, or the pitch of the repeating unit of the lens may be set so as to be the integral multiplication of the other width.

In a display device with above-mentioned structure, the combination base unit which includes the color filters of plural colors (the optical transparency base unit) and the optical no-transparency base units arranged between the color filters forms one pixel. The display device can prevent the moiré by setting either one width of the optical transparency base units (this is obtained by subtracting the total widths of the optical no-transparency base units arranged between color filters of plural colors from the width of the combination base unit) or the pitch of the repeating unit of the lens so as to be the integral multiplication of the other width. Therefore, for this display device, it is not always necessary to change a pitch of the mold for manufacturing the lens film part randomly.

(3) In the combination base unit, the optical transparency base units may be formed with color filters of plural colors and the optical no-transparency base unit may be arranged between the plural color filters. Either one width of the color filters or the pitch of the repeating unit of the lens may be set so as to be the integral multiplication of the other width.

In a display device with the above-mentioned structure, the combination base units which include the color filters of plural colors (the optical transparency base unit) and the optical no-transparency base units arranged between the color filters forms pixels, and these pixels are aligned in a so-called delta alignment. The display device can prevent the moiré by setting either one width of the optical transparency base units (this is obtained by subtracting the total widths of the optical no-transparency base units arranged between color filters of plural colors from the width of the combination base unit) or the pitch of the repeating unit of the lens so as to be the integral multiplication of the other width. Therefore, for this display device, it is not always necessary to change a pitch of the mold for manufacturing the lens film part randomly.

(4) The pitch of the repeating unit of the lens may be formed with the combination of a plurality of divided pitches.

Although the pitch of the repeating unit of the lens of the lens film part can be formed with a single pitch, in the case that the pitch of the repeating unit of the lens of the lens film part is formed with the combination of a plurality of divided pitches as described above, smaller lenses can be provided to the lens film part.

(5) The optical transparency base unit and the lens film part may be laminated so as to have a crossing angle θ, and either one width of the optical transparency base unit or a pitch transversing the repeating unit may be set so as to be the integral multiplication of the other width.

In case of a display device in which the pitch of the repeating unit of the lens is smaller than the width of the optical transparency base unit and the widths of them are not set to the integral multiplication, the display device can preferably prevent moiré fringes by setting the widths of the optical transparency base unit and the pitch as mentioned above.

Since the present invention is constituted as described above and it is not always necessary to change a pitch of the mold for manufacturing the lens film part randomly, the display device of the present invention can be manufactured more easily than the conventional one.

DESCRIPTION OF THE PREFERRED EMBODIMENTS

Figure 1:
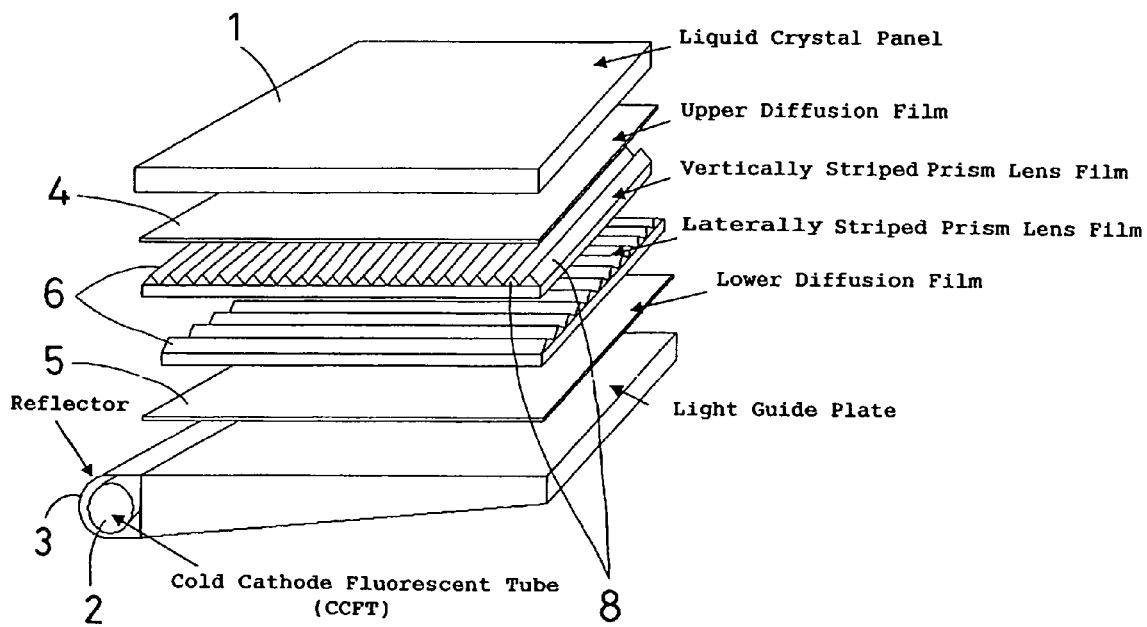
FIG. 1 is an exploded perspective view illustrating an embodiment of a display device according to the present invention.

Hereinafter, preferred embodiments of the present invention will be described referring to the drawings.

A First Embodiment

As shown in FIGS. 1 to 6, the display device of this embodiment is formed in such a manner that a lens film part 6 having a prism-array-shape made of vertically striped peaks and valleys (see FIG. 3) and a lens film part 6 having a prism-array-shape made of laterally striped peaks and valleys are arranged between a liquid crystal panel 1 having color filters (R, G, and B) (see FIG. 2) and a backlight (a cold cathode fluorescent tube 2 and a reflector 3) via an upper diffusion film 4 and a lower diffusion film 5 so as to improve luminance.

Figure 4:
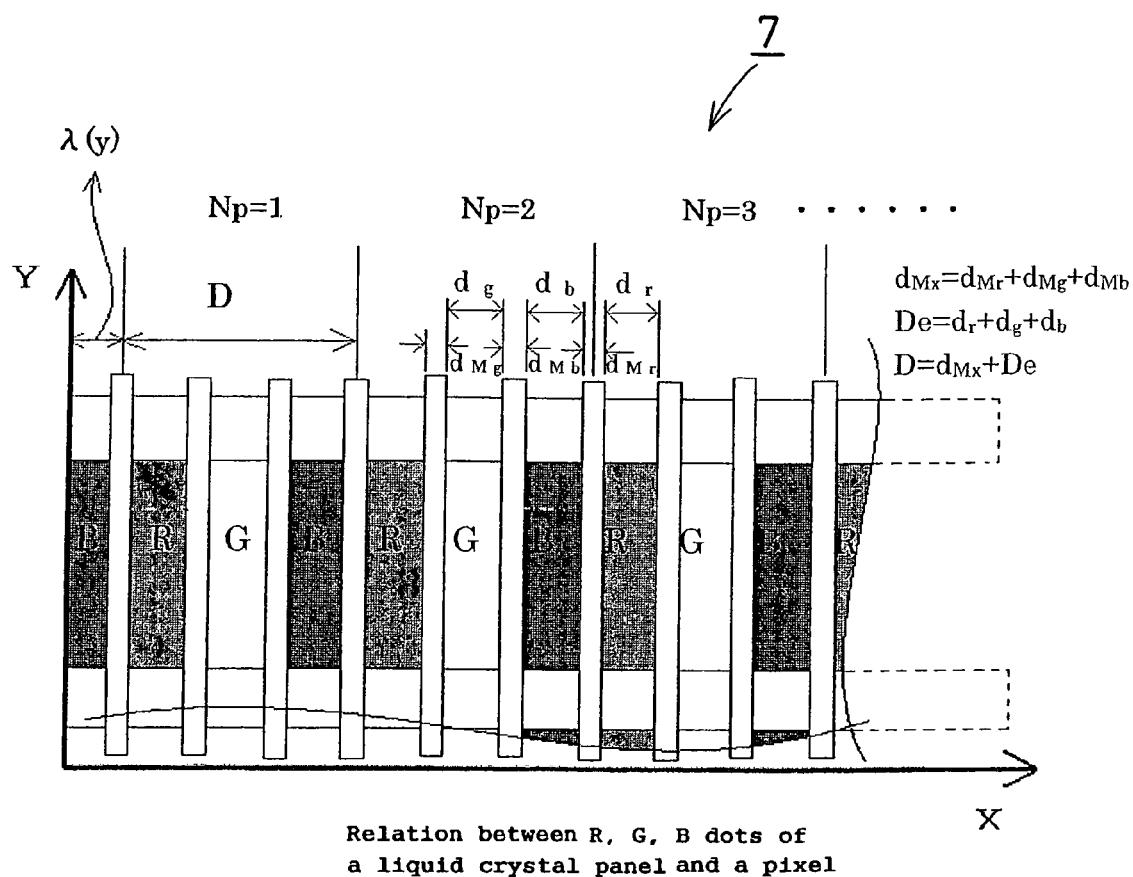
FIG. 4 is a view illustrating a relation between R, G, B dots of a liquid crystal panel and a pixel.
Figure 6:
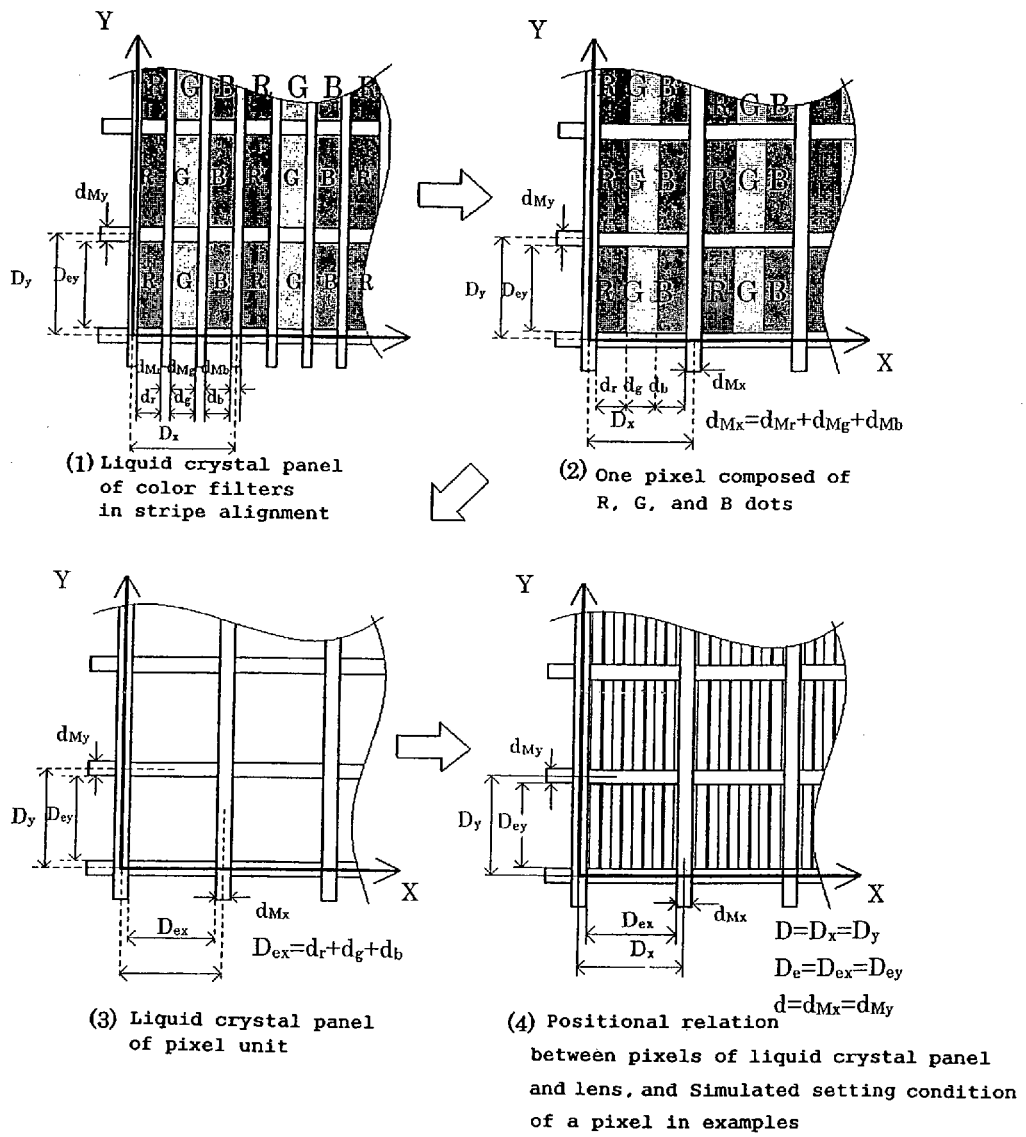
FIG. 6 is view illustrating a relation between R, G, and B dots in a stripe alignment and a pixel as well as a dot size, a pixel size, an electrode or a width of a black mask.

As shown in FIG. 4 and FIG. 6, an electrode or a black mask (an optical no-transparency base unit) corresponding to a red pixel (R, a width $d_r$) of color filters (R, G, B) is defined as $d_{Mr}$; an electrode or a black mask (an optical no-transparency base unit) corresponding to a green pixel (G, a width $d_g$) thereof is defined as $d_{Mg}$; and an electrode or a black mask (an optical no-transparency base unit) corresponding to a blue pixel (B, a width $d_b$) thereof is defined as $d_{Mb}$.

Then, an image control panel part 7 (see FIG. 2, FIG. 4, and FIG. 6) is continuously provided with combination base units ($D_e+d_{Mx}=D=D_x=D_y$) which include optical transparency base units ($d_r+d_g+d_b=D_e=D_{ex}=D_{ey}$) of color filters (R, G, B) and optical no-transparency base units ($d_{Mr}+d_{Mg}+d_{Mb}=d_{Mx}=d_{My}$) of electrodes or black masks, and the image control panel part 7 and the lens film part 6 (see FIG. 3 and FIG. 5) which is continuously provided with repeating units of lenses 8 having a prism-array-shape formed with the peaks and the valleys are laminated in a direction of light transmission.

Further, either one width of the optical transparency base unit ($d_r+d_g+d_b=D_e=D_{ey}$) or the pitch (P) of the repeating unit of the lens 8 are set so as to be the integral multiplication (one time) of the other width. The integer number means a positive natural number, namely, a natural number (1, 2, 3, 4, 5 . . . ). The pitch (P) of the repeating unit of the lens film part 6 means a size between the peaks or between the valleys.

Specifically, in the combination base unit ($D_e+d_{Mx}=D=D_x=D_y$), the optical transparency base unit ($d_r+d_g+d_b=D_e=D_{ex}=D_{ey}$) is formed with color filters (R, G, B) of plural colors (three colors), and the optical no-transparency base unit ($d_{Mr}, d_{Mg}, d_{Mb}$) is arranged between the plural color filters (R, G, B). The width of the optical transparency base unit ($D_e=D_{ex}=D_{ey}=d_r+d_g+d_b$), which is obtained by subtracting the total widths ($d_{Mr}+d_{Mg}+d_{Mb}=d_{Mx}=d_{My}$) of the optical no-transparency base units ($d_{Mr}, d_{Mg}, d_{Mb}$) arranged between the mutual color filters (R, G, B) of the plural colors from the width of the combination base unit ($D=D_x=D_y=D_e+d_{Mx}$), and the width of the pitch (P) of the repeating unit of the lens 8 are set so that the width of one of the optical transparency base unit and the pitch (P) is the integral multiplication of the width of the other.

In the above, either case is fine that the width of the optical transparency base unit ($d_r+d_g+d_b=D_e=D_{ex}=D_{ey}$) may be set so as to be the integral multiplication of the width of the pitch (P) of the repeating unit of the lens 8, or the width of the pitch (P) of the repeating unit of the lens 8 may be set so as to be the integral multiplication of the optical transparency base unit ($d_r+d_g+d_b=D_e=D_{ex}=D_{ey}$).

Figure 5:
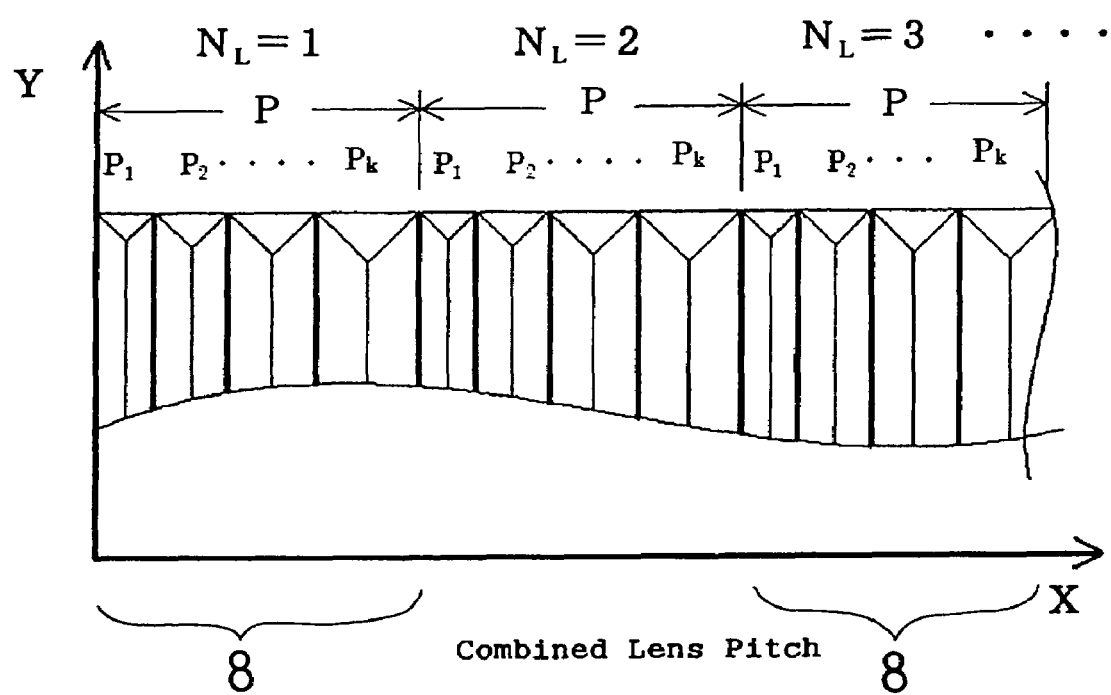
FIG. 5 is an explanatory view of a combined lens pitch.

Further, as shown in FIG. 5, the pitch (P) of the repeating unit of the lens 8 is formed with a combined lens pitch ($P=\Sigma_{Pi}=_{P1}+_{P2}+ \ldots +_{Pk}$) that is the combination of a plurality of predetermined divided pitches. There is no necessary that all width of respective divided pitches from $P_1$ to $P_k$ have to have different width, however, the all of them may have different width. For example, it can be set so as to be $P_1=P_2\neq P_3= \ldots =P_k$.

Next, the display device of the present embodiment in use is will be described below.

The display device of the present invention can prevent the moiré fringes by setting either one width of the optical transparency base unit ($d_r+d_g+d_b=D_e=D_{ex}=D_{ey}$) or the pitch (P) of the repeating unit of the lens 8 so as to be the integral multiplication of the other width. Therefore, the present embodiment has an advantage such that it is not always necessary to change a pitch of the mold for manufacturing the lens film part 6 randomly and the display device can be manufactured more easily than the conventional one.

Here, it is wholly unexpected that the moiré can be prevented and a periodicity of deviation, which conventionally has been a problem, can be eliminated by controlling a relation between a width of "the optical transparency base unit $(D_e=D_{ex}=D_{ey}=d_r+d_g+d_b)$" and the pitch (P) of the repeating unit of "the lens 8" instead of "the combination base unit $(D=D_x=D_y=D_e+d_{Mx})$ including the optical transparency base unit $(d_r+d_g+d_b=D_e=D_{ex}=D_{ey})$ and the optical no-transparency base unit $(d_{Mr}+d_{Mg}+d_{Mb}=d_{Mx}=d_{My})$". In other words, an unexpected preferable result can be obtained such that the moiré is not generated although the pitch (P) of the repeating unit of the lens film part 6 is gradually deviated with respect to the combination base unit of the liquid crystal panel 1 $(D_e+d_{Mx}=D=D_x=D_y)$.

Further, a display device in which one pixel (R, G, B) is formed with the combination base unit $(D_e+d_{Mx}=D=D_x=D_y)$ including the color filters of plural colors (the optical transparency base unit) and the optical no-transparency base unit $(d_{Mr}+d_{Mg}+d_{Mb}=d_{Mx}=d_{My})$ arranged between the color filters has an advantage such that the moiré can be prevented by setting either one width of the optical transparency base unit $(d_r+d_g+d_b=D_e=D_{ex}=D_{ey})$ (this is obtained by subtracting the total widths of the optical no-transparency base units arranged between color filters of plural colors from the width of the combination base unit) or the pitch (P) of the repeating unit of the lens 8 so as to be the integral multiplication of the other width. Therefore, the display device has another advantage such that it is not always necessary to change a pitch of the mold for manufacturing the lens film part 6 randomly.

Further, the pitch (P) of the repeating unit of the lens 8 of the lens film part 6 can be formed with a single pitch, however, the pitch (P) of the repeating unit of the lens 8 of the lens film part 6 can be formed with the combination of a plurality of divided pitches $(P=\Sigma_{Pi}=P_1+P_2+\ldots+P_k)$ so that smaller lenses 8 can be provided to the lens film part 6. Therefore, the present embodiment has an advantage such that the higher definition image can be obtained.

A Second Embodiment

A display device of the second embodiment is different from the first embodiment mainly in that pixels are aligned in a so-called delta alignment.

The display device according to this embodiment (see FIG. 1) is formed in such a manner that a lens film part 6 having a prism-array-shape made of vertically striped peaks and valleys (see FIG. 3) and a lens film part 6 having a prism-array-shape made of laterally striped peaks and valleys are arranged between a liquid crystal panel 1 having color filters (R, G, and B) (see FIG. 7) and a backlight (a cold cathode fluorescent tube 2 and a reflector 3) via an upper diffusion film 4 and a lower diffusion film 5 so as to improve luminance.

Then, an image control panel part 7 (see FIG. 7) is continuously provided with combination base units $(D=D_{ex}+d_{Mx}=D_{ey}+d_{My})$ including optical transparency base units $(D_{ex}=D_{ey})$ of color filters (R, G, B) and optical no-transparency base units $(d_{Mx}=d_{My})$ of electrodes or black masks, and the image control panel part 7 and the lens film part 6 (see FIG. 3) which is continuously provided with repeating units of lenses 8 are laminated in a direction of light transmission.

In addition, the width of the optical transparency base unit $(D_{ex}=D_{ey})$ and the width of the pitch (P) of the repeating unit of the lens 8 are set so that the width of one of them is the integral multiplication (one time) of the width of the other.

The integer number means a positive natural number, namely, a natural number (1, 2, 3, 4, 5 . . . ). The pitch (P) of the repeating unit of the lens film part 6 means a size between the peaks or between the valleys. Further, as shown in FIG. 5, the pitch (P) of the repeating unit of the lens 8 can be formed with a combined lens pitch $(P=\Sigma_{Pi}=P_1+P_2+\ldots+P_k)$ that is the combination of a plurality of predetermined divided pitches.

Specifically, in the combination base unit $(D=D_{ex}+d_{Mx}=D_{ey}+d_{My})$, the optical transparency base unit $(D_{ex}=D_{ey})$ is formed with color filters (R, G, B) of plural colors (three colors) in a so-called delta alignment, and the optical no-transparency base unit $(d_{Mx}=d_{My})$ is arranged between the plural color filters (R, G, B). Either one width $(D_e=D_{ex}=D_{ey})$ of each color filter (R, G, B) or the pitch (P) of the repeating unit of the lens 8 is set so as to be the integral multiplication (one time) of the other width.

In the above, either case is fine that the width of the optical transparency base unit $(D_{ex}=D_{ey})$ may be set so as to be the integral multiplication of the width of the pitch (P) of the repeating unit of the lens 8, or the width of the pitch (P) of the repeating unit of the lens 8 may be set so as to be the integral multiplication of the optical transparency base unit $(D_{ex}=D_{ey})$.

Next, the display device of the present embodiment in use is will be described below.

The display device of the present invention can prevent the moiré fringes by setting either one width of the optical transparency base unit $(D_{ex}=D_{ey})$ or the pitch (P) of the repeating unit of the lens 8 so as to be the integral multiplication (one time) of the other width. Therefore, the present embodiment has an advantage such that it is not always necessary to change a pitch of the mold for manufacturing the lens film part 6 randomly and the display device can be manufactured more easily than the conventional one.

Here, it is wholly unexpected that the moiré can be avoided (namely, deterioration of the display quality due to the generation of the moiré such as dark and light, a mono tone, and a rainbow can be prevented) and a periodicity of deviation, which conventionally has been a problem, can be eliminated by controlling a relation between the width of "the optical transparency base unit $(D_{ex}=D_{ey})$" and the width of the pitch (P) of the repeating unit of "the lens 8" instead of "the combination base unit $(D=D_{ex}+d_{Mx}=D_{ey}+d_{My})$ including the optical transparency base unit $(D_{ex}=D_{ey})$ and the optical no-transparency base unit $(d_{Mx}=d_{My})$". In other words, an unexpected preferable result can be obtained such that the moiré is not generated although the pitch (P) of the repeating unit of the lens film part 6 is gradually deviated with respect to the combination base unit of the liquid crystal panel 1 $(D=D_{ex}+d_{Mx}=D_{ey}+d_{My})$.

Further, a display device in which pixels are formed with the combination base unit $(D=D_{ex}+d_{Mx}=D_{ey}+d_{My})$ including the color filters of plural colors (the optical transparency base unit) and the optical no-transparency base unit $(d_{Mx}=d_{My})$ arranged between the color filters and these pixels are aligned in a so-called delta alignment can prevent the moiré by setting either one width of the color filters (R, G, and B) or the pitch (P) of the repeating unit of the lens 8 so as to be the integral multiplication (one time) of the other width. Therefore, for the display device, it is not always necessary to change a pitch of the mold for manufacturing the lens film part 6 randomly.

Further, the pitch (P) of the repeating unit of the lens 8 of the lens film part 6 can be formed with a single pitch, however, the pitch (P) of the repeating unit of the lens 8 of the lens film part 6 can be formed with the combination of a plurality of divided pitches $(P=\Sigma_{Pi}=P_1+P_2+\ldots P_k)$ so that smaller lenses 8 can be provided to the lens film part 6. Therefore, the present embodiment has an advantage such that the higher definition image can be obtained.

A Third Embodiment

A display device of the third embodiment is different from the first embodiment mainly in that the transparency base unit and the lens film part are laminated so as to have a crossing angle θ.

The display device according to this embodiment (see FIG. 1) is formed in such a manner that a lens film part 6 having a prism-array-shape made of vertically striped peaks and valleys (see FIG. 8) and a lens film part 6 having a prism-array-shape made of laterally striped peaks and valleys are arranged between a liquid crystal panel 1 having color filters (R, G, and B) (see FIG. 2) and a backlight (a cold cathode fluorescent tube 2 and a reflector 3) via an upper diffusion film 4 and a lower diffusion film 5 so as to improve luminance.

As shown in FIG. 4, an electrode or a black mask (an optical no-transparency base unit) corresponding to a red pixel (R, a width $d_r$) of color filters (R, G, B) is defined as $d_{Mr}$; an electrode or a black mask (an optical no-transparency base unit) corresponding to a green pixel (G, a width $d_g$) thereof is defined as $d_{Mg}$; and an electrode or a black mask (an optical no-transparency base unit) corresponding to a blue pixel (B, a width $d_b$) thereof is defined as $d_{Mb}$.

Then, an image control panel part 7 is continuously provided with combination base units ($D_e+d_{Mx}=D=D_x=D_y$) including optical transparency base units ($d_r+d_g+d_b=D_e=D_{ex}=D_{ey}$) of color filters (R, G, B) and optical no-transparency base units ($d_{Mr}+d_{Mg}+d_{Mb}=d_{Mx}=d_{My}$) of electrodes or black masks, and the image control panel part 7 and the lens film part 6 is continuously provided with repeating units of lenses 8 are laminated in a direction of light transmission. As shown in a lower part of FIG. 8, the lens film part 6 is laminated so as to have the crossing angle of θ with respect to the optical transparency base unit (an X-Y axis) (the ridgelines of the peaks and the valleys have an angle).

In addition, either one width of the optical transparency base unit ($D_e=D_{ex}=D_{ey}=d_r+d_g+d_b$) or the pitch (P) of the repeating unit of the lens 8 (an effective pitch ($P_e$) of the repeating unit of the lens 8 transversing the repeating unit) is set so as to be the integral multiplication (one time) of the other width. The integer number means a positive natural number, namely, a natural number (1, 2, 3, 4, 5 . . . ). The pitch ($P_e$) of the repeating unit of the lens film part 6 means a size between the peaks or between the valleys. Further, as shown in FIG. 5, the effective pitch ($P_e$) of the repeating unit of the lens 8 can be formed with a combined lens pitch ($P_e=\Sigma_{Pi}=_{P1}+_{P2}+ \ldots +_{Pk}$) that is the combination of a plurality of predetermined divided pitches.

Specifically, in the combination base unit ($D_e+d_{Mx}=D=D_x=D_y$), the optical transparency base unit ($d_r+d_g+d_b=D_e=D_{ex}=D_{ey}$) is formed with color filters (R, G, B) of plural colors (three colors), and the optical no-transparency base unit ($d_{Mr}, d_{Mg}, d_{Mb}$) is arranged between the plural color filters (R, G, B). Either one width of the optical transparency base unit ($D_e=D_{ex}=D_{ey}=d_r+d_g+d_b$), which is obtained by subtracting the total widths ($d_{Mr}+d_{Mg}+d_{Mb}=d_{Mx}=d_{My}$) of the optical no-transparency base units ($d_{Mr}, d_{Mg}, d_{Mb}$) arranged between the mutual color filters (R, G, B) of the plural colors from the width of the combination base unit ($D_e+d_{Mx}=D=D_x=D_y$), or the effective pitch ($P_e$) of the repeating unit of the lens 8 is set so as to be the integral multiplication (one time) of the other width.

In the above, the width of the optical transparency base unit ($d_r+d_g+d_b=D_e=D_{ex}=D_{ey}$) may be set so as to be the integral multiplication of the width of the effective pitch ($P_e$) of the repeating unit of the lens 8, or the width of the effective pitch ($P_e$) of the repeating unit of the lens 8 may be set so as to be integral multiplication of the optical transparency base unit ($d_r+d_g+d_b=D_e=D_{ex}=D_{ey}$).

Next, the display device of the present embodiment in use is will be described below.

The display device of the present invention can prevent the moiré fringe by setting either one width of the optical transparency base unit ($d_r+d_g+d_b=D_e=D_{ex}=D_{ey}$) or the effective pitch ($P_e$) of the repeating unit of the lens 8 so as to be the integral multiplication (same magnification) of the other width. Therefore, the present embodiment has an advantage such that it is not always necessary to change a pitch of the mold for manufacturing the lens film part 6 randomly and the display device can be manufactured more easily than the conventional one.

Here, it is wholly unexpected that the moiré can be avoided and a periodicity of deviation, which conventionally has been a problem, can be eliminated by controlling a relation between the widths of "the optical transparency base unit ($D_e=D_{ex}=D_{ey}=d_r+d_g+d_b$)" and the pitch (P) of the repeating unit of "the lens 8" instead of "the combination base unit ($D=D_x=D_y=D_e+d_{Mx}$) including the optical transparency base unit ($d_r+d_g+d_b=D_e=D_{ex}=D_{ey}$) and the optical no-transparency base unit ($d_{Mr}+d_{Mg}+d_{Mb}=d_{Mx}=d_{My}$)". In other words, an unexpected preferable result can be obtained such that the moiré is not generated although the pitch (P) of the repeating unit of the lens film part 6 is gradually deviated with respect to the combination base unit of the liquid crystal panel 1 ($D_e+d_{Mx}=D=D_x=D_y$).

Further, a display device having such pixels (R, G, B) that one pixel (R, G, B) is formed with the combination base unit ($D_e+d_{Mx}=D=D_x=D_y$) including the color filters of plural colors (the optical transparency base unit) and the optical no-transparency base unit ($d_{Mr}+d_{Mg}+d_{Mb}=d_{Mx}=d_{My}$) arranged between the color filters has an advantage such that the moiré can be avoided by setting either one width of the optical transparency base unit ($d_r+d_g+d_b=D_e=D_{ex}=D_{ey}$) (this is obtained by subtracting the total widths of the optical no-transparency base units arranged between color filters of plural colors from the width of the combination base unit) or the effective pitch ($P_e$) of the repeating unit of the lens 8 so as to be the integral multiplication of the other width. Therefore, the display device has another advantage such that it is not always necessary to change a pitch of the mold for manufacturing the lens film part 6 randomly.

Further, the optical transparency base unit ($d_r+d_g+d_b=D_e=D_{ex}=D_{ey}$) and the combination base unit ($D_e+d_{Mx}=D=D_x=D_y$) are laminated so as to have a crossing angle θ (namely, the ridgelines of the peaks and the valleys have an angle) and the widths of the optical transparency base unit ($d_r+d_g+d_b=D_e=D_{ex}=D_{ey}$) and the effective pitch ($P_e$) of the repeating unit of the lens 8, which the effective pitch ($P_e$) is the transversal pitch of the repeating unit ($D_e+d_{Mx}=D=D_x=D_y$), are set so that the width of one of the optical transparency base unit and the effective pitch is the integral multiplication (one time) of the width of the other. Therefore, in case of a display device in which the pitch (P) of the repeating unit of the lens 8 is smaller than the width of the optical transparency base unit ($d_r+d_g+d_b=D_e=D_{ex}=D_{ey}$) and the widths of them are not set to the integral multiplication, the display device can preferably prevent moiré fringes by setting the widths of the optical transparency base unit and the effective pitch as mentioned above.

Further, the pitch (P) of the repeating unit of the lens 8 of the lens film part 6 can be formed with a single pitch, however, the pitch (P) of the repeating unit of the lens 8 of the lens film part 6 can be formed with the combination of a plurality of divided pitches ($P = \Sigma_{Pi} = P_1 + P_2 + \ldots + P_k$ so that smaller lenses 8 can be provided to the lens film part 6. Therefore, the present embodiment has an advantage such that the higher definition image can be obtained.

EXAMPLE 1

Figure 2:
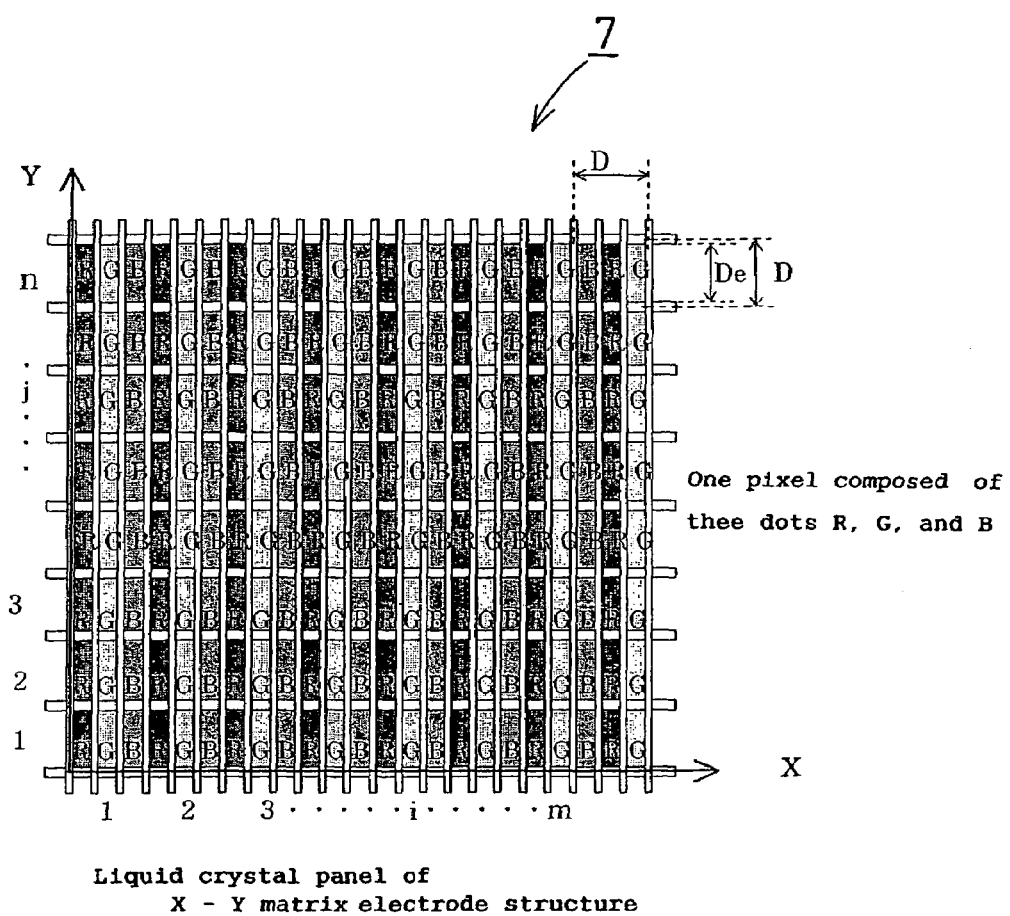
FIG. 2 is an explanatory drawing of a liquid crystal panel of an X-Y matrix electrode structure.
Figure 3:
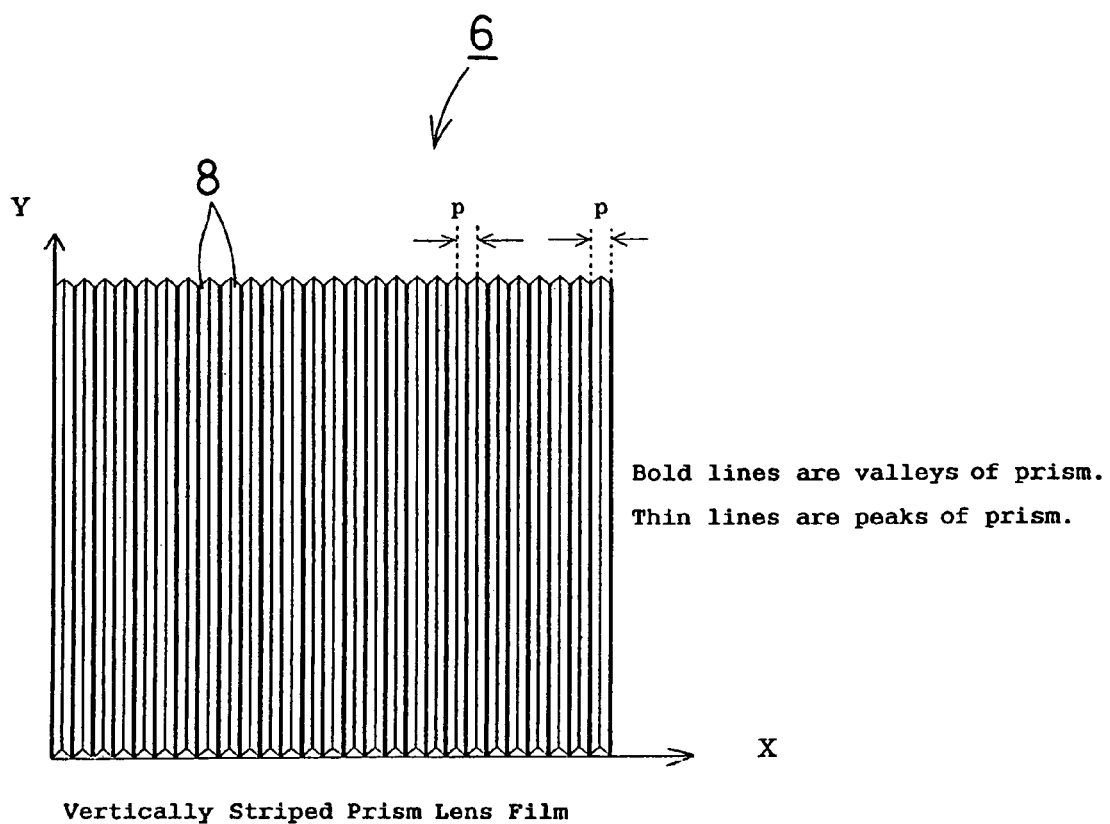
FIG. 3 is an explanatory drawing of a vertically striped prism lens.

As shown in FIG. 2, in the liquid crystal panel of an X-Y matrix electrode structure, it is defined that one pixel is formed with three dots, namely, R, G, and B. The pixel is counted from 1, 2, 3 ... i ... m in the order in the X axial direction and counted from 1, 2, 3 ... j ... n in the order in the Y axial direction.

FIG. 6 illustrates a relation between the pixel and R, G, and B dots in a stripe alignment as well as dot size, pixel size, a width of an electrode or a black mask. In the color film liquid crystal panel in the stripe alignment shown in FIG. 6(1), each width of the color filters (R, G, B) is defined as $d_r$, $d_g$, and $d_b$, respectively; each width of the electrode or the black mask between respective color filters (R, G, B) is defined as $d_{Mr}$, $d_{Mg}$ and $d_{Mb}$, respectively; and the width of one pixel which is the total width of the both widths, is defined as $D_x$ (in the X axial direction) and $D_y$ (in the Y axial direction) (same as D in FIG. 2 and FIG. 4).

In FIGS. 6(2), 6(3), and 6(4), one pixel is formed with R, G, and B dots and the total width of the widths $d_r$, $d_g$, and $d_b$ of the color filters (R, G, B) is defined as an optical transparency base unit ($d_r + d_g + d_b = D_e = D_{ex} = D_{ey}$) and the width $d_{Mr}$, $d_{Mg}$ and $d_{Mb}$ of the electrode or the black mask is defined as an optical no-transparency base unit ($d_{Mr} + d_{Mg} + d_{Mb} = d_{Mx} = d_{My}$). Then, the combination of the optical no-transparency base unit ($d_r + d_g + d_b = D_e = D_{ex} = D_{ey}$) formed with the color filters (R, G, B) and the optical no-transparency base unit ($d_{Mr} + d_{Mg} = d_{Mb} = d_{Mx} = d_{My}$) formed with the electrode or the black mask is defined as a combination base unit ($D_e + d_{Mx} = D = D_x = D_y$) and the combination base unit forms one pixel.

Figure 8:
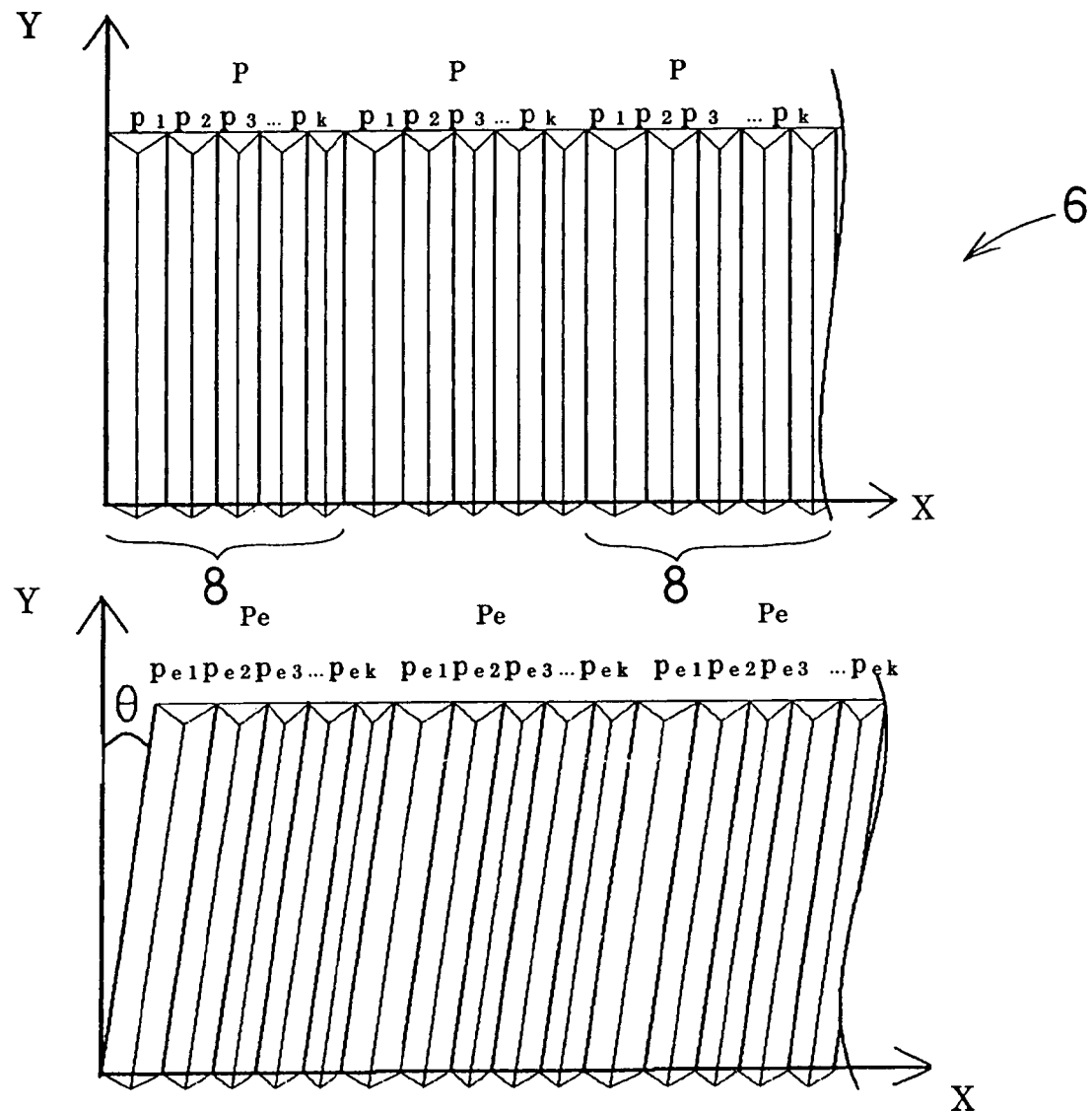
FIG. 8 is an explanatory view of an effective lens pitch.
Figure 9:
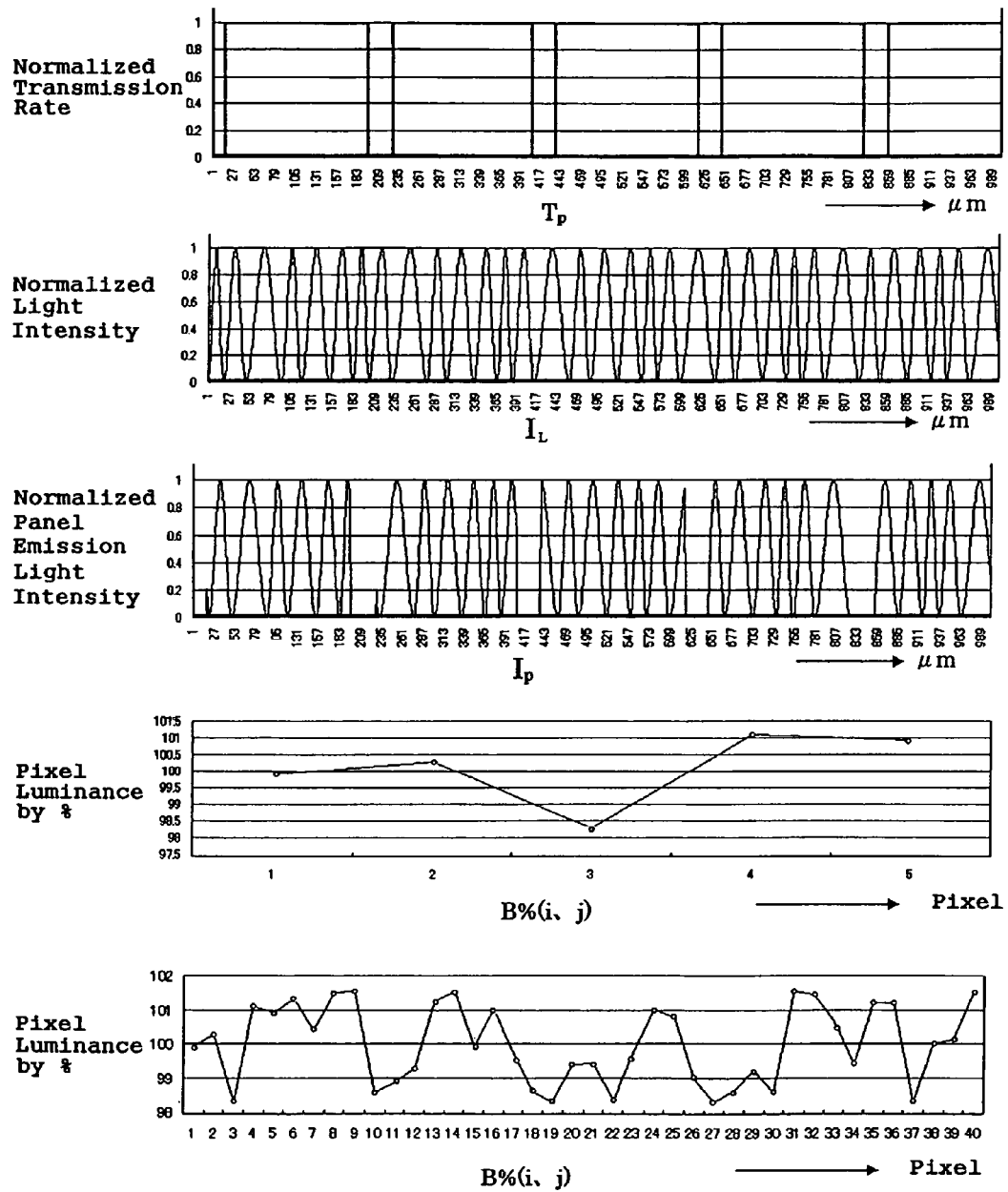
FIG. 9 is a graph explaining a result of a first embodiment of a table 1.
Figure 10:
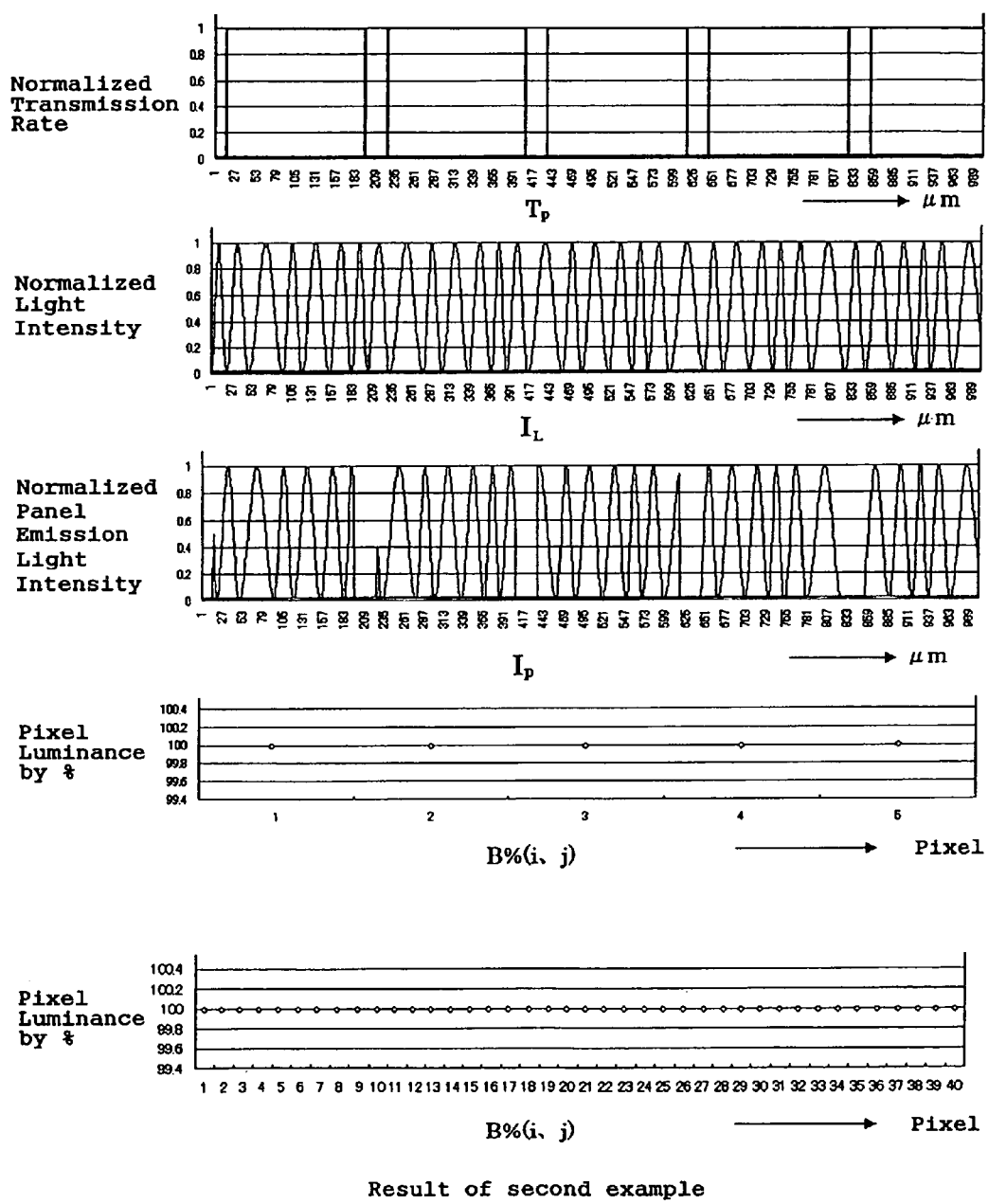
FIG. 10 is a graph explaining a result of a second embodiment of a table 1.
Figure 11:
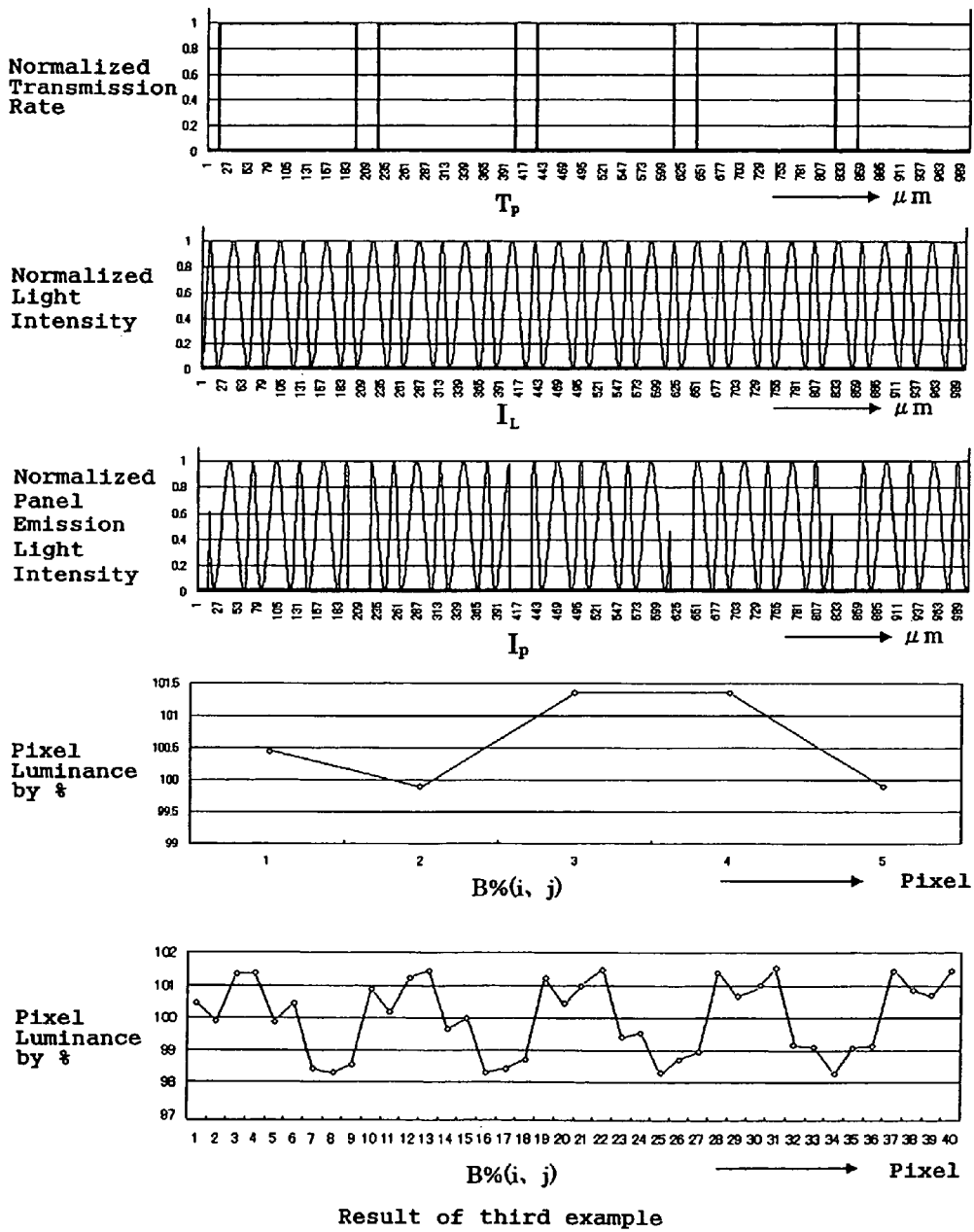
FIG. 11 is a graph explaining a result of a third embodiment of a table 1.
Figure 12:
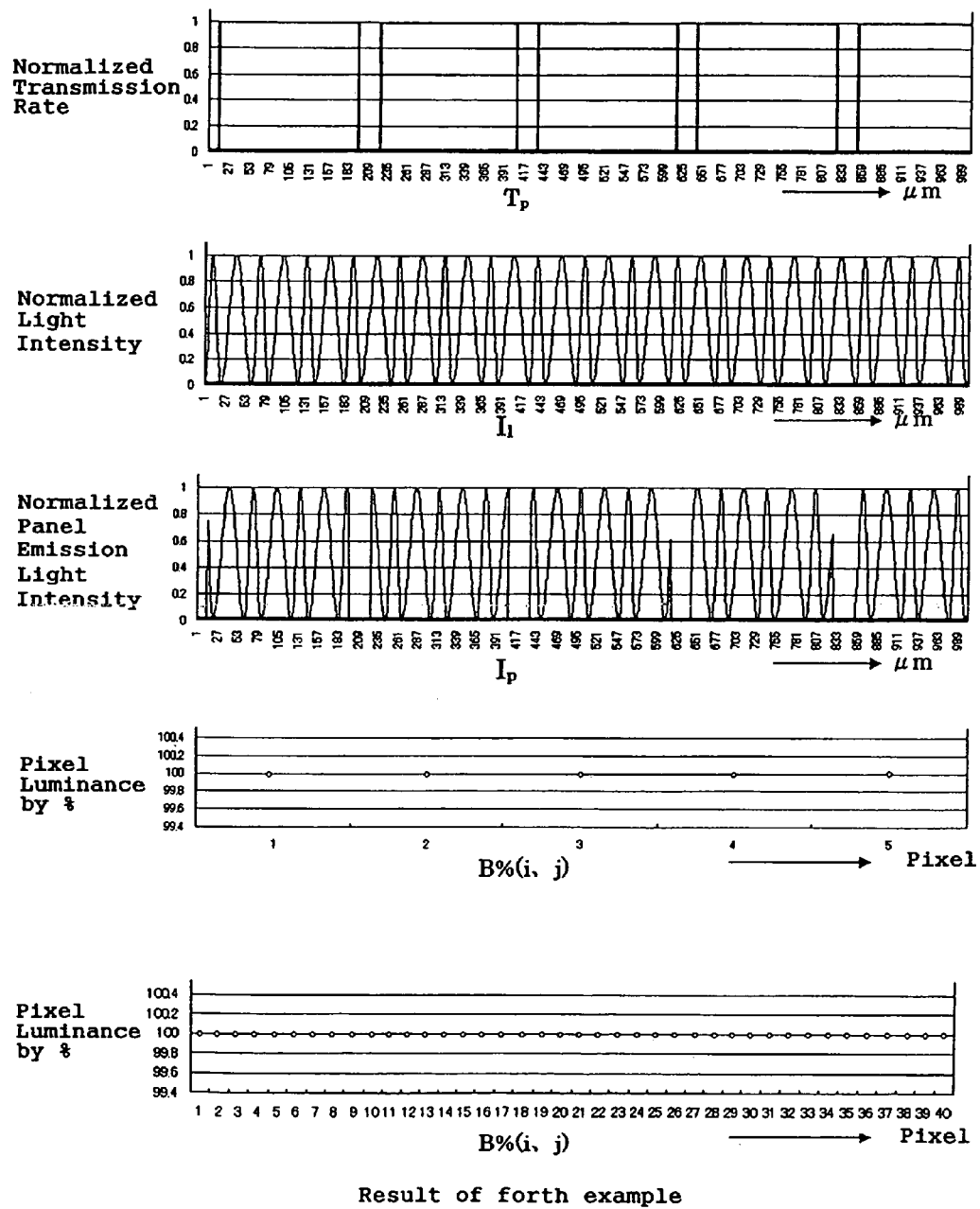
FIG. 12 is a graph explaining a result of a forth embodiment of a table 1.
Figure 13:
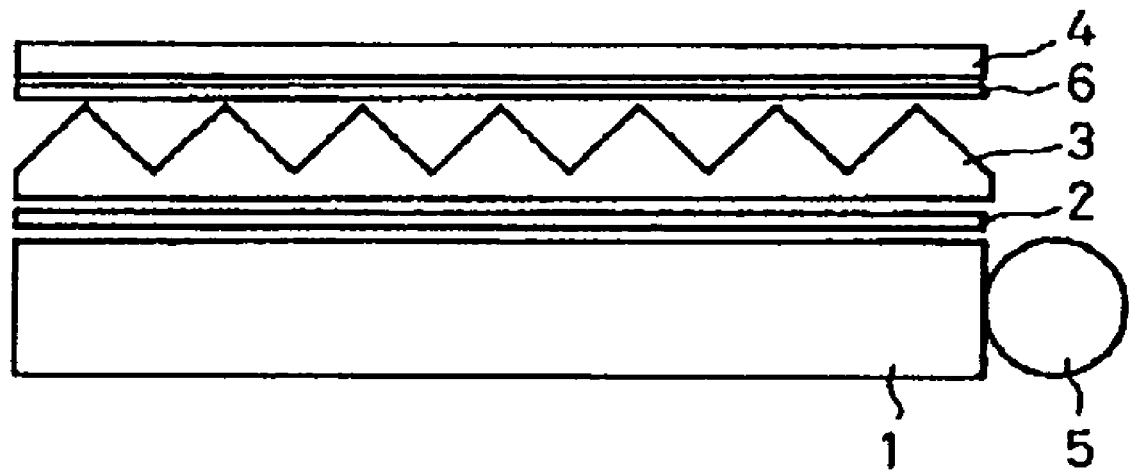
FIG. 13 is an exemplary diagram showing a cross-sectional surface of a conventional display device.
Figure 14:
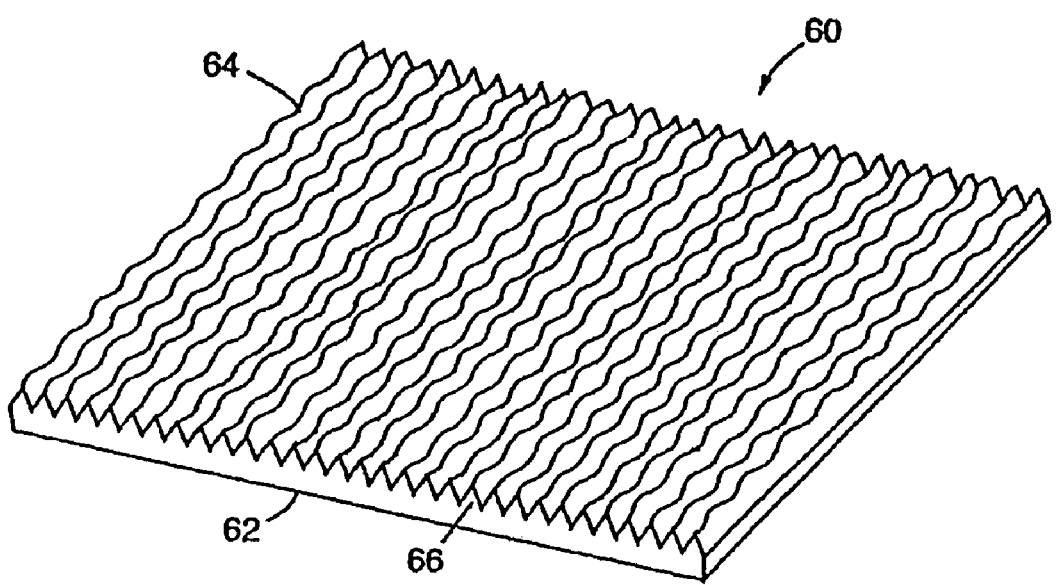
FIG. 14 is a view showing an optical film of the conventional display device.

As shown in FIG. 5, a divided pitch in one pitch in the prism lens film part is defined as $P_i = P_1, P_2 \ldots P_k$ (when the ridgelines have an angle with respect to the electrode as shown in FIG. 8, it is defined as an effective pitch $P_{ei}$). A light transmission factor of a liquid crystal panel is defined as $T_p$ and a light intensity emitted from a prism lens film part is defined as $I_L$. A simulation is made assuming $T_p$ as a rectangular periodic function of a light transmission rate a in a window period with the electrode part or the black mask part having a light transmission factor of zero or in the color filter part; and assuming $I_L$ as a trigonometric function of a light intensity coefficient $\beta$.

As shown in FIG. 4, pixel numbers of the liquid crystal panel are defined to be $N_p = 1, 2, 3 \ldots$. Then, $N_p$ and $T_p$ can be obtained by the following function when $T_p$ is a rectangular window function of the liquid crystal panel and $\lambda(y)$ is a shift amount of the ridgeline of the prism lens film part in the X axial direction.

[Expression 1]

$$N_p = ROUNDUP((x+\lambda(y))/D, 0)$$

$$T_p = \alpha * IF((x+\lambda(y)) > N_p * D + d_M), 0, 1) \quad (1)$$

On the other hand, $N_L$ and $I_{L1}, I_{L2}, \ldots I_{Lk}$ may be represented by the following function when $N_L$ is the lens number (see FIG. 5) and $I_{L1}, I_{L2}, \ldots I_{Lk}$ is the approximated value of the light intensity which is outputted from the lens pitches $p_1, p_2, \ldots, p_k$ by the trigonometric function, and then the light intensity is normalized so that the maximum value thereof becomes 1 and the minimum value becomes 0.

[Expression 2]

$$N_L = ROUDUP(x/P, 0)$$

$$I_{L1} = \beta * (0.5 + 0.5 * \cos(2\pi * (x - (N_L - 1) * p)/p_1 + \pi)) * \left( IF\left(x > (N_L - 1) * p + \sum_{i=1}^{1} Di, 0, 1\right) \right)$$

$$I_{L2} = \beta * \left(0.5 + 0.5 * \cos\left(2\pi * \left(x - (N_L - 1) * \sum_{i=1}^{1} \sum Pi\right) / p_2 + \pi\right)\right) * \left( IF\left(x > (N_L - 1) * p + \sum_{i=1}^{2} p_i, 0, 1\right) - IF\left(x > N_L - 1) * p + \sum_{i=1}^{2} p_i, 0, 1\right) \right)$$

$$\vdots$$

$$I_{Lk} = \beta * \left(0.5 + 0.5 * \cos\left(2\pi * \left(x - (N_L - 1) * p - \sum_{i=1}^{k-1} p_i\right) / p_n + \pi\right)\right) * \left( IF\left(x > (N_L - 1) * p + \sum_{i=1}^{k} p_i, 0, 1\right) - IF\left(x > N_L - 1) * p + \sum_{i=1}^{k-1} p_i, 0, 1\right) \right)$$

Accordingly, the no light intensity which is emitted from the lens may be represented as follows.

[Expression 3]

$$I_L = \sum_{i=1}^{k} I_{Li} \quad (2)$$

Multiply the normalized light intensity emitted from the lens and the window function of the liquid crystal panel, and the product is the normalized light intensity emitted from the transparent part of the liquid crystal panel and this may be represented by the following expression.

[Expression 4]

$$I_p = T_p * \sum_{i=1}^{k} I_{Li} \quad (3)$$

A luminance B emitted from the pixel of (i, j) may be represented by the following expression.

[Expression 5]

$$B(i,j) = \int_{D+d_M/2}^{(j+1)D - dM/2} \int_{D+d_M/2}^{(i+1)D - dM/2} I_p dx dy \quad (4)$$

(i=0, 1, 2, 3 ... m, j=0, 1, 2, 3, ... n)

However, in the example, $d_M = d_{Mx} = d_{My} = D - D_e$, $D = D_x = D_y$, $D_e = D_{ex} = D_{ey}$.

A ratio of each pixel to a global average of B (i,j) is represented by a percent by the following expression.

[Expression 6]

$$B_{\%}(i,j) = 100 * B(i,j) \bigg/ \left\{ \sum_{i=0}^{m} \sum_{j=0}^{n} B(i,j)/m*n \right\} (\%) \quad (5)$$

EXAMPLE 2

The transmission rate α of the transparent part of the pixel of the liquid crystal panel and an emitted light factor β of a prism lens part are normalized into 1. The size of one pixel ($D_x$: a combination base unit; $D_{ex}$: an optical transparency base unit; $d_M$: an optical no-transparency base unit) is set like examples 1 to 4 of a table 1. The ridgelines of the peaks and the valleys of the lens are arranged in parallel with the Y axis. The shift amounts (the deviation amount) of 20%, 50%, and 80% of the electrode width $d_M$ in the X axial direction are defined as $\lambda_1(y)$, $\lambda_2(y)$, and $\lambda_3(y)$, respectively. Its result is shown in the table 1.

and B (three colors) is respectively defined as $D_{ex}$. In this case, a relation of $D_{ex}$ (an optical transparency base unit: a color filter of one color)+$d_{Mx}$ (an optical no-transparency base unit: an electrode or the like between the color filters)=$D_{ey}$+$d_{My}$=D (the combination base unit) is satisfied.

In addition, also in the stripe alignment of FIG. 4, the moiré can be prevented when the above-described expression (6) ($D_{ex}$=P= . . . ) is satisfied where the width (one color) of each color filter of R, G, and B (three colors) is respectively defined as $D_{ex}$. A relation of $D_{ex}$ (an optical transparency base unit: a color filter of one color)+$d_{Mx}$ (an optical no-transparency base unit: an electrode between the color filters or the like) =$D_{ey}$+$d_{My}$=D (the combination base unit) is satisfied in this case too.

EXAMPLE 4

In the case that the pitch (P) of the lens film part is smaller than the width ($D_{ex}$) of the optical transparency base unit, namely, $D_{ex}$>P, the moiré can be prevented by setting the ridgelines of the peaks or the valleys of the lens so as to have an angle θ with respect to the Y axis of the liquid crystal panel as shown in FIG. 8 while satisfying the following expression (8) and by setting either one width $D_{ex}$ of the optical trans-

TABLE 1

| Example | Pixel (μm) | | | Lens pitch (μm) | | | | | | | λ(y)(μm) | | | Moiré of dark and light (%) |
| --- | --- | --- | --- | --- | --- | --- | --- | --- | --- | --- | --- | --- | --- | --- |
| | $D_x$ | $D_{ex}$ | $d_M$ | $p_1$ | $p_2$ | $p_3$ | $p_4$ | $p_5$ | $p_6$ | P | $\lambda_1(y)$ | $\lambda_2(y)$ | $\lambda_3(y)$ | B % (max−min) |
| 1 | 210 | 180 | 30 | 20 | 28 | 45 | 25 | 35 | 30 | 183 | 6 | 15 | 24 | 3.3 |
| 2 | 210 | 183 | 27 | 20 | 28 | 45 | 25 | 35 | 30 | 183 | 5.4 | 13.5 | 21.6 | 0 |
| 3 | 210 | 180 | 30 | 21 | 40 | 21 | 40 | 21 | 40 | 183 | 6 | 15 | 24 | 3.3 |
| 4 | 210 | 183 | 27 | 21 | 40 | 21 | 40 | 21 | 40 | 183 | 5.4 | 13.5 | 21.6 | 0 |

Like the examples 2 and 4 of the table 1, in the case of $D_{ex}$=P, no moiré is generated. On the other hand, like the examples 1 and 3 of the table 1, in the case of $D_{ex}$≠P, unevenness of dark and light due to the interference of the liquid crystal panel and the striped lens, namely, the moiré is generated by 3.3% depending on a difference between $D_{ex}$ and P.

In addition, the amount of the moiré to be generated does not depend on the shift amount (the deviation amount) λ(y) in the X axial direction. In other words, the shift of the liquid crystal panel in the X axial direction with respect to the lens film part has no effect on the amount of the moiré.

FIGS. 9 to 12 illustrate the results of the examples 1, 2, 3, and 4 in the table 1. Here, $\lambda_2(y)$ is used for λ(y), respectively. In any combination, as long as satisfying the following expression, the moiré can be prevented.

[Expression 7]

$$D_{ex} = P = \sum_{i=1}^{K} p_i (i = 1, 2 \ldots k) \quad (6)$$

EXAMPLE 3

Figure 7:
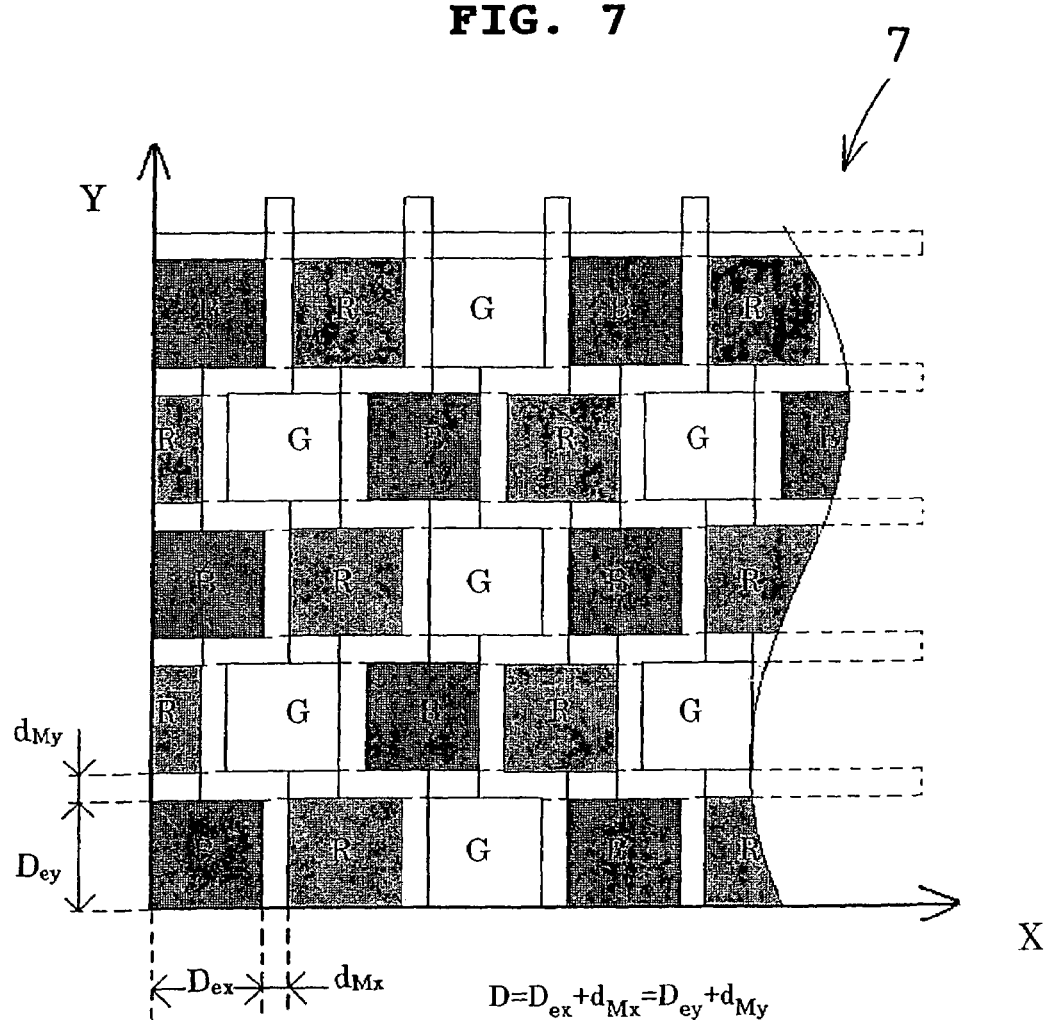
FIG. 7 is an explanatory view of a liquid crystal panel with a delta alignment.

FIG. 7 shows a liquid crystal panel with a delta alignment. In the case of this delta alignment the moiré can be prevented when the above-described expression (6) ($D_{ex}$)=P= . . . ) is satisfied where a width (one color) of each color filter of R, G, parency base unit or an effective pitch ($P_e$) of the repeating unit of the lens 8 so as to be the integral multiplication of the other width. Here, the effective pitch ($P_e$) is defined as a pitch ($P_e$=$P_{e1}$+$P_{e2}$+$P_{e3}$ . . . $P_{ek}$)transversing the lens pitch (P=$P_1$+$P_2$+$P_3$ . . . $P_k$) of the actual lens film part on the X axis.

[Expression 8]

$$D_{ex} = Pe = \sum_{i=1}^{k} Pei (i = 1, 2 \ldots k) \quad (7)$$

$$\theta = \pm \cos^{-1}(P/D_{ex}) \quad (8)$$

For example, in the examples shown in the table 1, if the $D_{ex}$ of the liquid crystal panel is changed to 185 μm, the moiré can be prevented by satisfying the formula (7) by setting the lens film so as to have an angle of about θ=±8.4 degrees against the Y axis. As described above, the display device can make an optimal adjustment by arranging the liquid crystal panel so that the ridgelines of the peaks or the valleys of the lens film part have the angle θ with respect to the electrode of the crystal panel.

Therefore, even in the case that the pitch (P) of the repeating unit of the lens is smaller than the width $D_{ex}$ of the optical transparency base unit and they are not set so that the width of one of them is integral multiplication of the width of the other, it is possible to preferably avoid the moiré by laminating the optical transparency base unit and the lens film part 6 so as to have the crossing angle of θ.

INDUSTRIAL APPLICABILITY

Therefore, the present invention has an advantage such that it is not always necessary to change a pitch of the mold for manufacturing the lens film part randomly and the display device can be manufactured more easily than the conventional one. As a result, the present invention can be preferably used for various kinds of display devices.

What is claimed is:

1. A display device comprising:
    an image control panel pan (7) continuously provided with combination base units each consisting of one optical transparency base unit and a plurality of optical no-transparency base units arranged in a single row, the optical transparency base unit of each combination base unit having a width dimension calculated by subtracting a sum of the widths of the optical no-transparency base units of that combination unit from the width of the combination base unit itself; and
    a lens film part (6) continuously provided with repeating units of lenses (8),
    wherein the image control panel (7) and the lens film part (6) are consecutively and continuously provided in a direction of light transmission, and characterized in that one of the width of an optical transparency base unit and a pitch of a repeating unit of a lens is set so as to be integral multiplication of the other.

2. The display device according to claim 1,
    wherein the optical transparency base unit of each of the combination base units is formed with color filters of plural colors, and the plurality of optical no-transparency base units of the combination base units are arranged between the color filters.

3. The display device according to claim 1,
    wherein the optical transparency base unit of each of the combination base units is fanned with color filters of plural colors, and the plurality of optical no-transparency base units are arranged between the color filters, and one of the width of a color filter and the pitch of the repeating unit of the lens (8) is set so as to be integral multiplication of the other.

4. The display device according to any one of claims 1 to 3,
    wherein the pitch of the repeating unit of the lens (8) is formed with a combination of a plurality of divided pitches.

5. The display device according to any one of claims 1 to 3,
    wherein the optical transparency base unit and the lens film part (6) are provided consecutively and continuously in each of the combination base units so that their sides are inclined at an angle relative to one another and one of a width of the optical transparency base units and a pitch transversing the repeating unit of the lens (8) is set so as to be integral multiplication of the other.

6. The display device according to claim 4,
    wherein the optical transparency base units and the lens film part (6) are provided consecutively and continuously in each of the combination base units so that their sides are inclined at an angle relative to one another and one of a width of the optical transparency base units and a pitch transversing the repeating unit of the lens (8) is set so as to be integral multiplication of the other.

\* \* \* \* \*